(12) United States Patent
Hama et al.

(10) Patent No.: US 11,241,619 B2
(45) Date of Patent: Feb. 8, 2022

(54) CONTENTS PROVIDING SYSTEM, CONTENTS PROVIDING METHOD, AND CONTENTS PROVIDING PROGRAM

(71) Applicant: TOYOTA BOSHOKU KABUSHIKI KAISHA, Aichi (JP)

(72) Inventors: Mitsuko Hama, Tokyo (JP); Nobuki Hayashi, Aichi (JP); Katsuhito Yamauchi, Aichi (JP); Asami Takayama, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 16/854,178

(22) Filed: Apr. 21, 2020

(65) Prior Publication Data

US 2020/0338448 A1 Oct. 29, 2020

(30) Foreign Application Priority Data

Apr. 24, 2019 (JP) .............................. JP2019-083038

(51) Int. Cl.
*A63F 13/537* (2014.01)
*A63F 13/212* (2014.01)
*A63F 13/86* (2014.01)

(52) U.S. Cl.
CPC .......... *A63F 13/537* (2014.09); *A63F 13/212* (2014.09); *A63F 13/86* (2014.09)

(58) Field of Classification Search
CPC ....... A63F 13/537; A63F 13/212; A63F 13/86
See application file for complete search history.

(56) References Cited

U.S. PATENT DOCUMENTS

| | | | |
|---|---|---|---|
| 2004/0157662 A1* | 8/2004 | Tsuchiya | A63F 13/5378 463/32 |
| 2006/0058103 A1 | 3/2006 | Danieli et al. | |
| 2006/0223635 A1* | 10/2006 | Rosenberg | A63F 13/332 463/37 |
| 2013/0127980 A1* | 5/2013 | Haddick | G02B 27/0093 348/14.08 |
| 2019/0247753 A1* | 8/2019 | Dugan | A63F 13/10 |

FOREIGN PATENT DOCUMENTS

JP 2006-81895 3/2006

* cited by examiner

*Primary Examiner* — Reginald A Renwick
(74) *Attorney, Agent, or Firm* — Greenblum & Bernstein, P.L.C.

(57) ABSTRACT

Provided is a contents providing system capable of inducing excitement of a spectator in a battle game. One embodiment of the present disclosure is a contents providing system including: an acquisition part acquiring, as player information, at least one of a posture, an amount of activity, and biological information from each of multiple players playing a battle game where multiple events occur simultaneously in one game space; and a processing part processing the player information acquired by the acquisition part into information-for-spectator to be provided for the spectator or an organizer of the battle game.

17 Claims, 4 Drawing Sheets

CONTENTS PROVIDING SYSTEM, CONTENTS PROVIDING METHOD, AND CONTENTS PROVIDING PROGRAM

CROSS-REFERENCE TO RELATED APPLICATIONS

The present application claims the benefit of Japanese Patent Application No. 2019-083038 filed on Apr. 24, 2019 with the Japan Patent Office, the entire disclosure of which is incorporated herein by reference.

BACKGROUND

The present disclosure relates to a contents providing system, a contents providing method, and a contents providing program.

In a battle game where multiple players play, there are spectators including an audience directly watching the game on-site and a viewer watching a play video distributed online off-site.

For such online viewers, a system has been conceived in which progress status of the game can be tracked (see Japanese Unexamined Patent Application Publication No. 2006-81895).

SUMMARY

The viewers who watch a battle game online are highly likely to quit watching the game when receiving less excitement because the game stagnates. However, it is difficult to inhibit the viewer from quitting if only the progress status of the game is provided to the viewer, per the above-described system. In addition, when the game is less exciting, a satisfaction of the audience on-site may also deteriorate.

In one aspect of the present disclosure, it is preferable to provide a contents providing system capable of inducing excitement of a spectator in a battle game.

One aspect of the present disclosure is a contents providing system including: an acquisition part configured to acquire, as player information, at least one of a posture, an amount of activity, and biological information from each of multiple players playing a battle game where multiple events occur simultaneously in one game space; and a processing part configured to process the player information acquired by the acquisition part into information-for-spectator to be provided for a spectator or an organizer of the battle game.

With this configuration, it is possible to provide player's own condition as the information-for-spectator for the spectator or the organizer during the match of the battle game. In addition, based on the information-for-spectator, it is possible to review a transition history of the player's own condition together with a replay after the match. Consequently, the excitement of the spectator can be induced, for example, at the time of stagnant progress of the match and after the match.

Furthermore, based on the information-for-spectator, it is possible to visually guide the spectator, in other words, to switch a viewpoint of a scene in a play video to a player with noteworthy behavior in real time. Thus, the excitement of the spectator including the audience on-site can be enhanced.

In one aspect of the present disclosure, in the battle game, the multiple players may each operate a character in the game space. With this configuration, it is possible to maintain the excitement of the spectator during the match in the battle game in which slow or rapid progress of the match tends to occur and multiple player-characters are participated.

One aspect of the present disclosure may further include an output part configured to generate a play video of the battle game based on the information-for-spectator and to output the play video. With this configuration, live comments, camerawork and the like based on the player information are appropriately provided for the spectator. Thus, it is possible to induce the excitement.

Another aspect of the present disclosure is a contents providing method including: acquiring, as player information, at least one of a posture, an amount of activity, and biological information from each of multiple players playing a battle game where multiple events occur simultaneously in one game space; and processing the player information, which is acquired, into information-for-spectator to be provided for a spectator or an organizer of the battle game.

With this configuration, by use of the information-for-spectator, it is possible to induce the excitement of the spectator at the time of stagnant progress of the match and after the match. In addition, the excitement of the spectator during the match can be enhanced.

Another aspect of the present disclosure is a contents providing program to make a computer execute a step of processing at least one of a posture, an amount of activity, and biological information into information-for-spectator, wherein the at least one of the posture, the amount of activity, and the biological information is acquired from each of multiple players playing a battle game where multiple events occur simultaneously in one game space, wherein the information-for-spectator is provided for a spectator or an organizer of the battle game.

With this configuration, by use of the information-for-spectator, it is possible to induce the excitement of the spectator at the time of stagnant progress of the match and after the match. In addition, the excitement of the spectator during the match can be enhanced.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENTS

1. First Embodiment

[1-1. Configuration]

Figure 1:
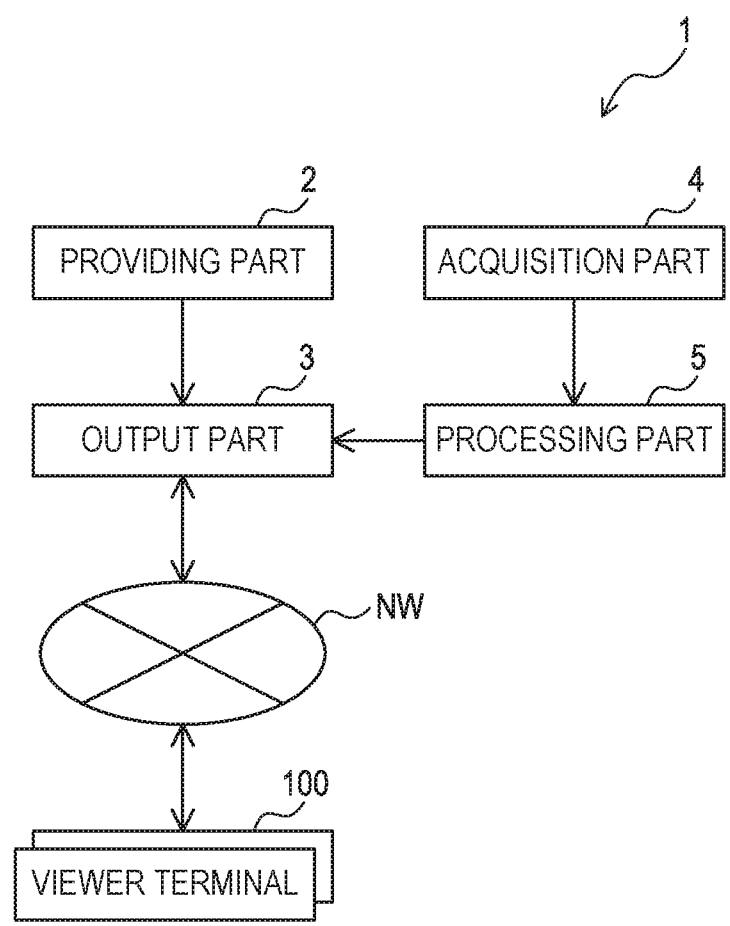
FIG. 1 is a schematic block-diagram showing a contents providing system in an embodiment.

A contents providing system 1 shown in FIG. 1 is a system for providing, as contents, context of a match of an online or offline battle-type video game (so-called e-sports) for spectators.

The "spectators" to whom the contents providing system 1 offers the contents include an "audience" and a "viewer". The "audience" may directly watch the match on a site where the battle game is performed (that is, where players play the battle game). The "viewer" watches the match off-site (for example, at home, in a facility off-site, and in a vehicle) via a network.

The contents providing system 1 includes a providing part 2, an output part 3, an acquisition part 4, and a processing part 5.

[Providing Part]

The providing part 2 provides the battle game. The providing part 2 is configured by an information processing device including, for example, a central processing unit (CPU) and a storage medium such as RAM and ROM storing a game program.

Multiple players play the battle game by operating their respective input devices or terminals (not shown) connected to the providing part 2 directly or via a network.

In the battle game provided by the providing part 2, multiple events may occur simultaneously in one game space. In other words, the providing part 2 provides a battle game that is designed such that multiple players each encounter an event simultaneously at different points in a common virtual space.

Examples of such battle game may include a real-time strategy (RTS) game, a battle royal game, and a puzzle game. Among them, the contents providing system 1 effectively fulfills a function of inducing excitement in the RTS game, the battle royal game and the like where the multiple players each operate a virtual character of the game in the game space.

In other words, the contents providing system 1 is capable of maintaining the excitement of the spectators during a match in the battle game in which slow or rapid progress of the match tends to occur and multiple player-characters are participated.

Figure 2:
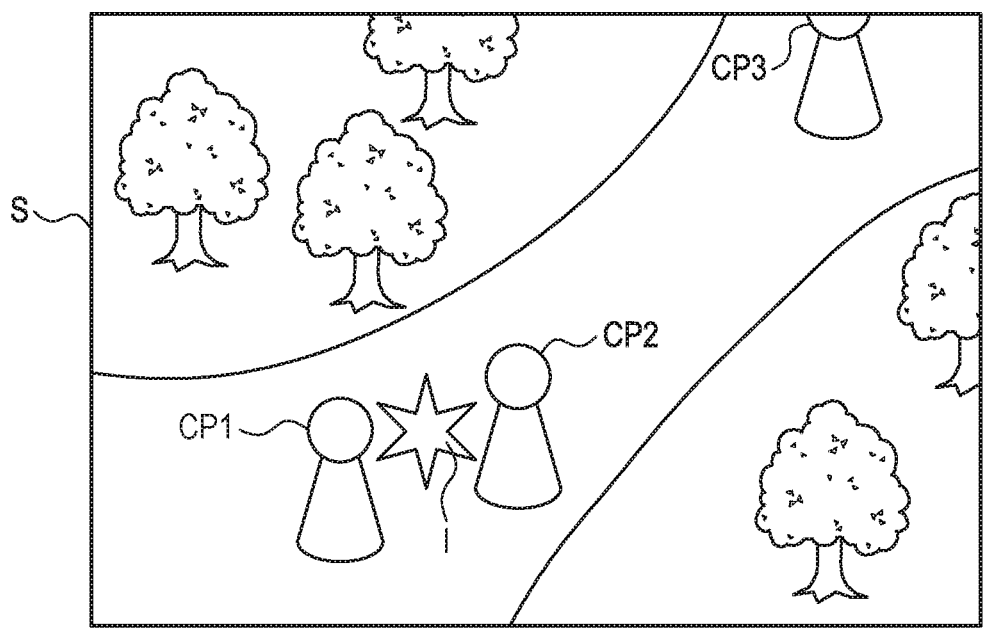
FIG. 2 is a schematic drawing showing one example of a screen of a battle game.

Furthermore, among these games, a multiplayer online battle arena (MOBA) to carry out a team competition is preferable as a target to induce the excitement. FIG. 2 shows one example of a game screen of MOBA.

A game screen S of FIG. 2 is a part of a play video partially describing a game space. In the game screen S, there are multiple player-characters PC1, PC2, PC3; however, in the game space, there are also other player-character(s) (PC) and non-player-character(s) (NPC).

In the game screen S, an event I (for example, fighting) occurs between the player-character PC1 and the player-character PC2. On the other hand, in MOBA, other events may occur between other PCs, or even between PCs and NPCs in an area not shown in the game screen S in the game space.

The providing part 2 outputs a processing result (that is, an output data of a game screen, sound and the like) of the playing battle game to the output part 3.

[Output Part]

The output part 3 provides a play video of the playing battle game for the spectators and the organizer. The output part 3 may include a display showing the game screen, a speaker playing the sound and sound effects, and a communicating device distributing the play video online. The providing part 2 and a part of the output part 3 (that is, the communicating device) configure a game server connected to a network (NW).

The output part 3 outputs a play video (including sound) to players playing the game and to the audience watching the match on-site. At the same time, the output part 3 distributes the play video to viewer online. In other words, the output part 3 carries out so-called a video distribution of the game play.

The output part 3 generates, from the processing result output from the providing part 2, a play video including at least a game screen and sound for the spectators. The output part 3 outputs the play video to the display and the speaker, and also send the play video to multiple viewer terminals 100 via the network NW.

When generating the play video, the output part 3 adjusts a configuration of the play video based on information-for-spectator generated by the processing part 5, which will be described later. Specifically, the output part 3 refers to the information-for-spectator generated by the processing part 5 based on player information, which will be described later, and the output part 3 conducts an editing process of adding camerawork in the play video, adding live sound or live captions to the play video, and adding visual effects or sound effects to the play video.

The play video generated by the output part 3 is simultaneously distributed to the viewer terminals 100 connected to a distribution server. It may also possible that the output part 3 generates multiple play videos at a time and, among the multiple play videos, the output part 3 distributes a play video requested by a viewer terminal 100 to the viewer terminal 100 that made the request.

[Acquisition Part]

The acquisition part 4 acquires, as player information, at least one of a posture, an amount of activity, and biological information from each of the multiple players playing the battle game.

The "posture" composing the player information includes, for example, a seated posture against a seat and a change in the seated posture of the player. The seated posture of the player can be estimated by, for example, an output of an acceleration sensor arranged in the seat.

The "amount of activity" composing the player information includes, for example, conversation information such as a sound pressure, an amount of utterances, a tempo, and a tone in a conversation of the players, and an input amount with respect to an input device such as a mouse, a key-hoard, and a pad.

The "biological information" composing the player information includes, for example, a heartbeat and a pulse of the player. The heartbeat and the pulse of the player is measured by a measurement device worn by the player.

[Processing Part]

The processing part 5 processes the player information of each of the multiple players acquired by the acquisition part 4 into the information-for-spectator to be provided for the spectators or the organizer of the battle game.

The processing part 5 is configured by, for example, a computer including a central processing unit (CPU) and a storage medium such as RAM and ROM. It should be noted that the processing part 5 may be included in the information processing device composing the providing part 2.

The processing part 5 first processes the player information into the information-for-spectator worthwhile to the spectators or the organizer. Then, the processing part 5 outputs the information-for-spectator to the output part 3 to provide the information-for-spectator for the spectators or the organizer.

Figure 3:
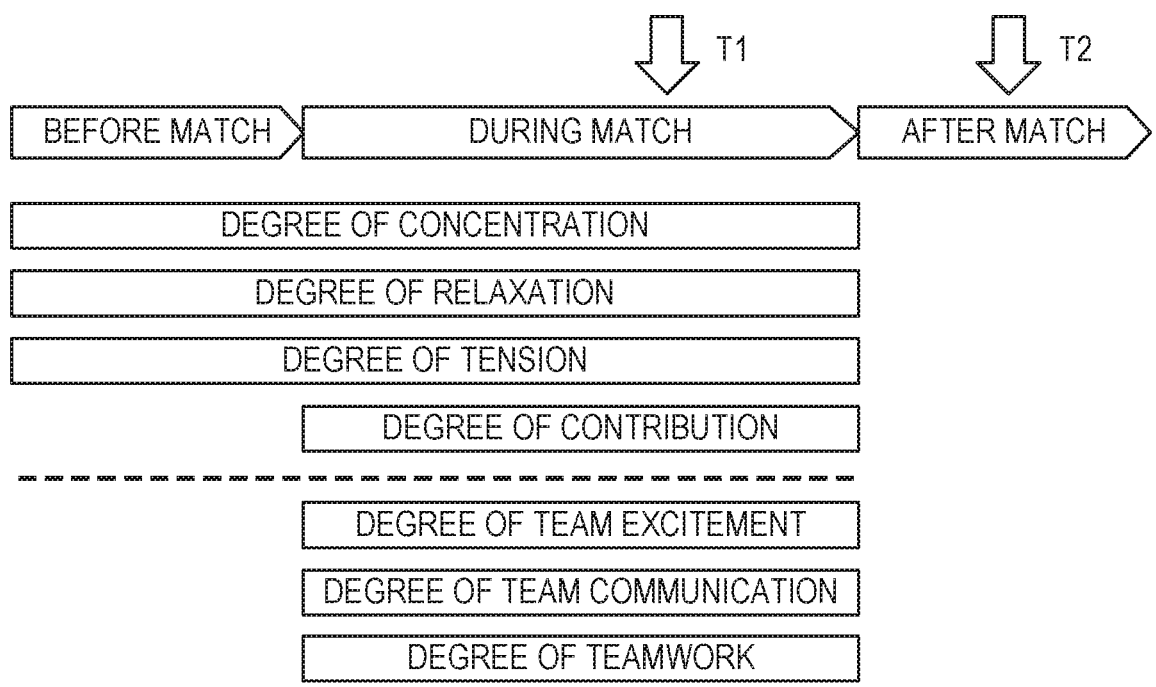
FIG. 3 is a schematic drawing showing one example of a flow of a game of the battle game.

The information-for-spectator includes, as shown in FIG. 3 for example, a personal variable such as a degree of concentration, a degree of relaxation, a degree of tension, and a degree of contribution of each player, and a team variable such as a degree of team excitement, a degree of team communication, and a degree of teamwork of each team.

The degree of concentration of the player is estimated by, for example, a body movement, the number of clicks of the mouse or the number of pressings of a button (that is, the number of inputs for a character operation).

The degree of relaxation of the player is estimated by, for example, an input amount of the key-board (that is, an amount of chat utterances), a sound pressure in a conversation, a change of the posture (that is, a body movement).

The degree of tension of the player is estimated by, for example, the sound pressure in the conversation of the players, and the number of heartbeats.

The degree of contribution of the player is determined by, for example, combining the amount of utterances in the team and the degree of concentration of the player with a score of the player in the game.

It should be noted that the degree of concentration, the degree of relaxation and the degree of tension of the player is each provided from a standby state of the player before the match to the end of the match. The degree of contribution of the player is provided during the match.

The degree of team excitement is estimated from, for example, the sum total of the sound pressure and the amount of utterances of each player in a conversation in the team, the sum total of the number of clicks of the mouse or the number of pressings of the button (that is, the number of inputs for the character operation) in the team, and a heartbeat interval (that is, RRI) of each player in the team.

The degree of team communication is estimated from, for example, the sound pressure, the tempo and the tone of each player in the conversation in the team.

The degree of teamwork is estimate by, for example, a rate of synchronization of breathings and the amount of utterances of each player in the team. The degree of teamwork may be estimated by considering a team score in the game.

The degree of team excitement, the degree of team communication, and the degree of teamwork are each provided during the match.

The information-for-spectator generated by the processing part 5 may be directly provided, by the output part 3, for the spectators (that is, the audience and the viewer) in the form of a numeric parameter. Also, the information-for-spectator may be provided, by the output part 3, for the organizer of the match, and the information-for-spectator may be used for a performance by the organizer.

The organizer may include a live commentator giving a live commentary on a progress of the match, and an operator selecting a viewpoint of a scene in the play video to be provided for the spectators.

The information-for-spectator provided for the live commentator is indirectly provided for the spectators as a qualitative information in which an interpretation of the live commentator is added.

For example, the personal variable included in the information-for-spectator is transmitted, by the live commentator, to the spectators as characteristics of the player and the team to which the player belongs. Also, the degree of tension of the player is transmitted, by the live commentator, to the spectators even as a degree of importance (that is, a degree of attention) of the progress of the ongoing match. Furthermore, the degree of contribution of the player is transmitted, by the live commentator, to the spectators as information for a prediction or determination of the most valuable player (MVP) to be elected after the match.

In addition, for example, among the team variables included in the information-for-spectator, the degree of team excitement is transmitted, by the live commentator, to the spectators as power of the present team. The degree of team communication is transmitted, by the live commentator, to the spectators as an indication of a progress in a future match. The degree of teamwork is transmitted, by the live commentator, to the spectators as an indication that the match will become exciting.

By providing such information-for-spectator by the live commentator, for example, at a stagnant timing T1 (when no big event occurs during the match) and at a replay timing T2 (after the match), it is possible to inhibit the viewer from quitting due to a less exciting match.

On the other hand, the operator conducts camerawork (that is, a switch of a viewpoint of a scene in the play video for the spectators) based on the information-for-spectator. For example, the operator moves a camera (that is, the viewpoint of a scene in the play video) so as to follow a movement of a player who is determined to be performing a mission. This provides the spectators with an existing scene without missing it.

The computer composing the processing part 5 executes, by use of the contents providing program, a step of processing at least one of the posture, the amount of activity, and the biological information (that is, the player information), which is acquired from each of the multiple players playing the battle game where multiple events may occur simultaneously in one game space, into the information-for-spectator to be provided for the spectators or the organizer of the battle game.

[1-2. Effect]

According to the above-described embodiment, the following effects can be obtained.

(1a) During the match of the battle game, a player's own condition can be provided for the spectators or the organizer as the information-for-spectator. In addition, it is possible to review a transition history of the player's own condition together with a replay after the match. Consequently, the excitement of the spectators can be induced, for example, at the time of stagnant progress of the match and after the match.

(1b) Based on the information-for-spectator, it is possible to visually guide the spectators, in other words, to switch a viewpoint of a scene in a play video to a player with noteworthy behavior in real time. Thus, the excitement of the spectators including the audience on-site can be enhanced.

(1c) The output part 3 generates the play video based on the information-for-spectator. Thus, the live commentaries, camerawork and the like based on the information-for-spectator can be appropriately provided for the spectators. Consequently, it is possible to induce the excitement of the spectators including the viewer who is less likely to receive realistic sensations.

2. Second Embodiment

[2-1. Configuration]

Figure 4:
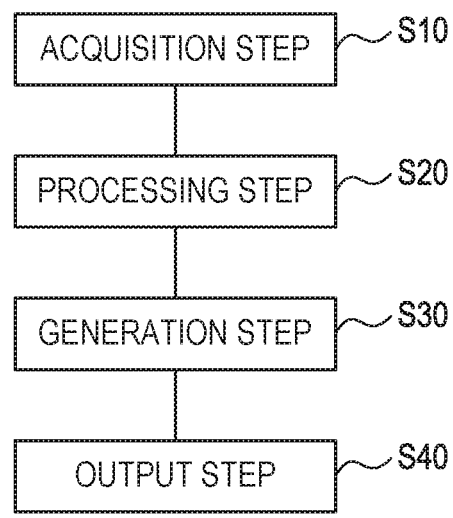
FIG. 4 is a flow diagram of a contents providing method in an embodiment.

A contents providing method shown in FIG. 4 includes an acquisition step S10, a processing step S20, a generation step S30, and an output step S40. The contents providing method is a method for distributing a play video of a battle game to a viewer by use of the contents providing system 1 of FIG. 1.

[Acquisition Step]

In this step, by use of the acquisition part 4 of FIG. 1, at least one of a posture, an amount of activity, and biological information is acquired as player information from each of the multiple players playing the battle game where multiple events may occur simultaneously in one game space.

[Processing Step]

In this step, by use of the processing part 5 of FIG. 1, the player information of each of the multiple players acquired in the acquisition step S10 is processed into information-for-spectator to be provided for the spectators or the organizer of the battle game.

[Generation Step]

In this step, based on the information-for-spectator processed in the processing step S20, a play video of the battle game is generated. This step may be executed by the output part 3 of FIG. 1. However, the play video may be generated by a manual operation such as an addition of commentaries by a live commentator who received the information-for-spectator and an addition of the camerawork by the operator who received the information-for-spectator.

[Output Step]

In this step, by use of the output part 3 of FIG. 1, the play video of the battle game generated in the generation step S30 is output to a display and a speaker on-site, and distributed to viewer terminals via the network N W.

[2-2. Effect]

According to the above-described embodiment, the following effects can be obtained.

(2a) By use of the information-for-spectator, it is possible to induce the excitement of the spectators at the time of stagnant progress of the match and after the match. In addition, the excitement of the spectators during the match can be enhanced.

3. Other Embodiment

A description has been made of embodiments of the present disclosure; however, the present disclosure is not limited to the above-described embodiments and can be variously modified.

(3a) In the contents providing system 1 of the above-described embodiments, the output part 3 does not necessarily have an online distribution function. In other words, the contents providing system 1 does not necessarily distribute the play video to the viewer online if the play video is at least provided for the audience on-site by the output part 3.

Also, the contents providing system 1 may conduct only an online distribution of the play video, for example, in a competition of a battle game having no site (that is, players play in remote locations).

(3b) In the contents providing system 1 of the above-described embodiment, the output part 3 does not necessarily have a function of generating a play video of the battle game based on the information-for-spectator. In other words, the play video may be generated only by a manual operation of the organizer.

(3c) A plurality of functions of a single element in the above-described embodiments may be achieved by a plurality of elements, and a function of each element may be integrated into a single element. Also, a part of a configuration in the above-described embodiments may be omitted. In addition, at least a part of a configuration in the above-described embodiments may be added to, or may replace, a configuration in other embodiment described above. Any form included in the technical idea defined by the language of the claims may be an embodiment of the present disclosure.

What is claimed is:

1. A contents providing system comprising:
a memory that stores instructions;
a processor that, when executing the instructions stored in the memory, performs operations including:
acquiring player information, including at least one of a posture, an amount of activity, and biological information, from each of multiple players playing a battle game where multiple events occur simultaneously in one game space;
processing the acquired player information into information-for-spectator to be provided for a spectator or an organizer of the battle game; and
generating a play video of the battle game in which a viewpoint of a scene is changed based on the information-for-spectator.

2. The contents providing system according to claim 1, wherein in the battle game, the multiple players each operate a character in the game space.

3. The contents providing system according to claim 1, wherein the processor further performs:
outputting the generated play video.

4. A contents providing method comprising:
acquiring player information, including at least one of a posture, an amount of activity, and biological information, from each of multiple players playing a battle game where multiple events occur simultaneously in one game space;
processing the acquired player information into information-for-spectator to be provided for a spectator or an organizer of the battle game; and
generating a play video of the battle game in which a viewpoint of a scene is changed based on the information-for-spectator.

5. A non-transitory computer-readable recording medium that stores a contents providing program to make a computer execute processing including:
acquiring at least one of a posture, an amount of activity, and biological information from each of multiple players playing a battle game where multiple events occur simultaneously in one game space,
processing the acquired at least one of the posture, the amount of activity, and the biological information into information-for-spectator, wherein the information-for-spectator is provided for a spectator or an organizer of the battle game, and
generating a play video of the battle game in which a viewpoint of a scene is changed based on the information-for-spectator.

6. The contents providing system according to claim 1, wherein the amount of activity includes conversation information of the players or an input amount.

7. The contents providing system according to claim 1, wherein the information-for-spectator includes a variable indicating a degree of teamwork in teams to which the multiple players belong.

8. The contents providing system according to claim 1, wherein the information-for-spectator includes a personal variable and a team variable, the personal variable indicating a degree of concentration, a degree of relaxation, a degree of tension, or a degree of contribution of each of the multiple players, and the team variable indicating a degree of team excitement, a degree of team communication, or a degree of teamwork of each of the teams.

9. The contents providing system according to claim 1, wherein the spectator or the organizer is a person who watches a match on a site where the battle game is performed.

10. The contents providing method according to claim 4, wherein the amount of activity includes conversation information of the players or an input amount.

11. The contents providing method according to claim 4, wherein the information-for-spectator includes a variable indicating a magnitude of teamwork in teams to which the multiple players belong.

12. The contents providing method according to claim 4, wherein the information-for-spectator includes a personal variable and a team variable, the personal variable indicating a degree of concentration, a degree of relaxation, a degree of tension, or a degree of contribution of each of the multiple players, and the team variable indicating a degree of team excitement, a degree of team communication, or a degree of teamwork of each of the teams.

13. The contents providing method according to claim 4, wherein the spectator or the organizer is a person who watches a match on a site where the battle game is performed.

14. The non-transitory computer-readable recording medium according to claim 5, wherein the amount of activity includes conversation information of the players or an input amount.

15. The non-transitory computer-readable recording medium according to claim 5, wherein the information-for-spectator includes a variable indicating a degree of teamwork in teams to which the multiple players belong.

16. The non-transitory computer-readable recording medium according to claim 5, wherein the information-for-spectator includes a personal variable and a team variable, the personal variable indicating a degree of concentration, a degree of relaxation, a degree of tension, or a degree of contribution of each of the multiple players, and the team variable indicating a degree of team excitement, a degree of team communication, or a degree of teamwork of each of the teams.

17. The non-transitory computer-readable recording medium according to claim 5, wherein the spectator or the organizer is a person who watches a match on a site where the battle game is performed.

* * * * *